United States Patent [19]
Fujii et al.

[11] Patent Number: 4,991,216
[45] Date of Patent: Feb. 5, 1991

[54] METHOD FOR SPEECH RECOGNITION

[75] Inventors: Satoru Fujii; Katsuyuki Niyada, both of Sagamihara, Japan

[73] Assignee: Matsushita Electric Industrial Co., Ltd., Japan

[21] Appl. No.: 501,386

[22] Filed: Mar. 23, 1990

Related U.S. Application Data

[63] Continuation of Ser. No. 653,849, Sep. 24, 1984, abandoned.

[30] Foreign Application Priority Data

Sep. 22, 1983 [JP] Japan ................................ 58-175304
Mar. 27, 1984 [JP] Japan ................................ 59-58706
Mar. 27, 1984 [JP] Japan ................................ 59-58709

[51] Int. Cl.$^5$ ............................................. G10L 5/00
[52] U.S. Cl. .......................................... 381/41; 381/43
[58] Field of Search ............................ 364/513, 513.5; 381/41–43

[56] References Cited

U.S. PATENT DOCUMENTS 4,092,493  5/1978  Rabiner et al. ............... 381/43
4,400,828  8/1983  Pirz et al. ..................... 381/43
4,592,085  5/1986  Watari et al. .................. 381/43
4,601,054  7/1986  Watari et al. .................. 381/43
4,618,984  10/1986 Das et al. ....................... 381/43
4,624,010  11/1986 Takebayashi ................... 381/41
4,625,287  11/1986 Matsuura et al. ............... 381/43

FOREIGN PATENT DOCUMENTS 58-145998  2/1982  Japan .

Primary Examiner—Dale M. Shaw
Assistant Examiner—David D. Knepper
Attorney, Agent, or Firm—Lowe, Price, LeBlanc, Becker & Shur

[57] ABSTRACT

Phoneme standard patterns are prepared beforehand using speech sounds from a number of individual speakers. Unknown input speech sounds are divided into continuous frames and then some of these frames are extracted such that extracted frames include noncontinuous frames. LPC cepstrum coefficients are obtained for each of the frames and a mean value is obtained from the LPC cepstrum coefficients for each of the phonemes. A first standard pattern is then formed for each of the phonemes belonging to each group determined by characteristics of known speech sounds. Spectrum information of the unknown input speech sounds is produced using such extracted frames, and is then compared with the phoneme standard patterns prestored in a storage to determine and recognize phonemes of the unknown speech sounds by calculating similarity between the two using a statistical distance measure. When obtaining LPC cepstrum coefficients through LPC analysis, the order of LPC cepstrum coefficients is set to a value below the order of LPC analysis. The method according to the present invention reduces the amount of calculations necessary to perform speech recognition without deteriorating phoneme and word recognition rate.

8 Claims, 12 Drawing Sheets

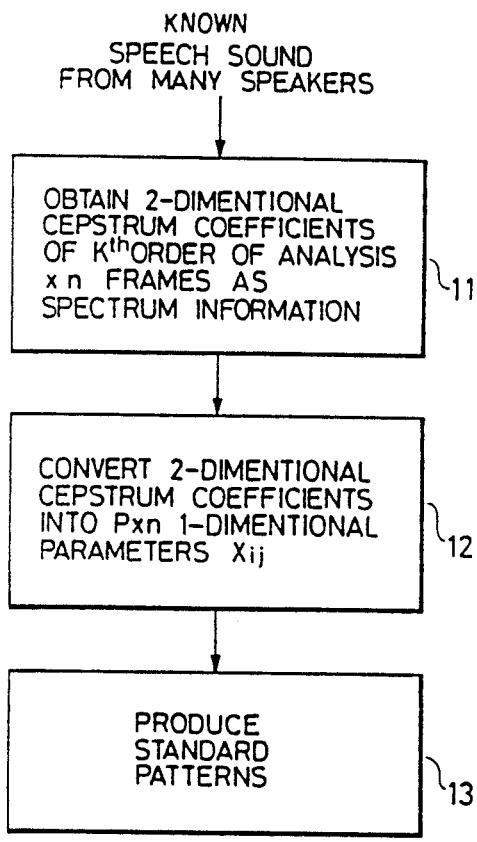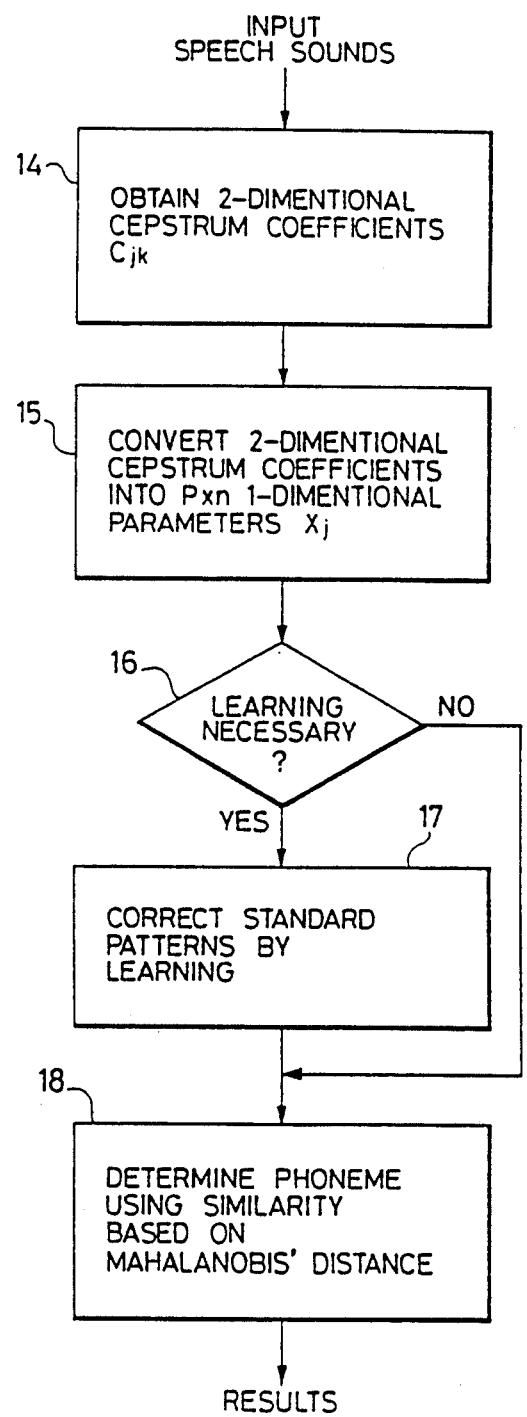

METHOD FOR SPEECH RECOGNITION

This application is a continuation of application Ser. No. 06/653,849, filed Sept. 24, 1984, now abandoned.

BACKGROUND OF THE INVENTION

This is a continuation-in-part application of an earlier application titled "APPARATUS FOR SPEECH RECOGNITION" filed Sept. 4, 1984 by the present applicants (Serial Number being unknown), claiming priority of three Japanese Patent applications filed Sept. 5, 1983, July 27, 1984 and Aug. 16, 1984.

This invention relates generally to a method for speech recognition, and more particularly to such a method for recognizing speech by way of phoneme recognition.

Apparatus for speech recognition which automatically recognizes spoken words is an extremely useful measure for supplying computers or apparatus with various data and instructions. In prior speech recognition apparatus, a pattern-matching method is usually adopted as an operating principle. According to this method, various standard patterns are prepared and prestored in a memory in advance in connection with all words to be recognized, and the degree of similarity between an input unknown pattern and the standard patterns is computed for determining that the input pattern data is the same word as the word whose similarity is determined to be the highest. In this pattern-matching method, since it is necessary to prepare standard patterns of all words to be recognized, new standard patterns have to be inputted and stored for each individual speaker. Therefore, to recognize more than several hundreds of words, it is time-consuming and troublesome to register all these words spoken by each individual speaker. Furthermore, a memory used for storing such dictionary of spoken words must have an extremely large capacity. Moreover, this method suffers from a drawback that it takes a long period of time for effecting matching comparison between an input pattern and the standard patterns as the number of words in the word dictionary increases.

Another speech recognition method determines similarity between words prestored in a word dictionary in the form of phonemes, and input sounds which are recognized as a combination of phonemes. In the phoneme method, the capacity of the memory required for the word dictionary is reduced, the period of time required for pattern matching comparison is shortened, and the contents of the word dictionary can be readily changed. For instance, since a sound "AKAI" can be expressed by way of a simple form of "a k a i" with three different phonemes /a/, /k/ and /i/ being combined, it is easy to handle a number of spoken words emitted from unspecific speakers.

In speech recognition for unspecific speaking persons (speaker independent systems), since the characteristics of sounds drastically change depending on sex distinction and age difference, a problem to be solved is how to classify various characteristics of sounds so as to recognize words spoken by unspecific persons. Namely, in the case of recognizing speech in the units of phoneme, phoneme standard patterns suffer from dispersion due to sex distinction and age difference of speaking persons since the shape of spectrum of a vowel /a/ changes drastically depending on sex.

Therefore, the most important point to be considered in recognition of speech spoken from unspecific persons is to obtain a high speech recognition rate for any speaking persons with any acoustic environment with stability. For obtaining such high speech recognition rate, speaking persons using the system should be prevented from shouldering an execessive burden, while the apparatus for speech recognition should not require high-cost portions. However, these points have been insufficient hitherto in speech recognition apparatus proposed or produced as a trial.

In a method of using a predicted error disclosed in "EVALUATION OF LPC DISTANCE MEASURE AIMING RECOGNITION OF VOWELS IN SPEECH IN CONVERSATION" by Shikano and Koda in Transactions of The Institute of Electronic & Communication Engineers of Japan, VOL J-63D, No. 5, May, 1980, a predicted error is obtained by the following formula with the most similar parameter $A_{ij}$ (j=1, 2, ..., p, wherein p is the order of analysis) of a phoneme i being obtained by way of linear prediction analysis using speech sounds of a number of speaking persons:

$$N_i = \sum_{j=1}^{p} A_{ij} S_j$$

wherein $S_j$ is an autocorrelation coefficient obtained from unknown input speech sounds.

The predicted error $N_i$ is obtained for each phoneme, which is an objective, as a distance measure, and a phoneme causing the smallest value of $N_i$ is determined as the result of recognition.

However, since the most similar parameter $A_{ij}$ corresponding to a standard pattern of a phoneme is just an average value in this method, it is impossible to deal with sound variation due to co-articulation even though a learning function is provided for producing $A_{ij}$ again to make it suitable for a present speaking person, and therefore the above-mentioned method suffers from a low recognition rate.

Furthermore, the method has a drawback that the recognition rate cannot be increased because phonemes of vowels and semivowels are determined by way of standard patterns in units of frames so as to effect segmentation and phoneme recognition as combinations of determined results, and therefore time-dependent variation cannot be sufficiently captured.

To compensate for the above-mentioned defects another method has been tried such that a number of standard patterns corresponding to a number of speaking persons are provided for each phoneme, and similarity calculation is executed in connection with all the standard patterns for input speech sounds so as to determine which standard pattern shows the highest similarity or to calculate similarity to phoneme standard patterns paying attention to time-dependent variation of the sepectrum of consonants, semivowels and contracted sounds of unknown input speech sounds. However, this method requires an enormous amount of calculations and results in high cost of the speech recognition apparatus.

SUMMARY OF THE INVENTION

The present invention has been developed in order to remove the above-described drawbacks inherent to the conventional method for speech recognition.

It is, therefore, an object of the present invention to provide new and useful method for speech, recognition with which a high recognition rate is attained with stability irrespective of the change in speaking persons and words.

According to another object of the present invention the amount of calculations necessary for speech recognition is small compared to conventional methods.

In order to achieve the above objects, standard patterns formed of spectrum information of a plurality of frames are produced for respective phonemes using speech sounds emitted from a number of speaking persons, and speech recognition is then effected using similarity or phoneme strings obtained on the basis of a statistical distance measure, such as Mahalanobis' distance using the standard patterns and spectrum information.

In addition, unknown sounds are divided into a plurality of continuous frames, and a plurality of frames which includes noncontinuous frames are extracted or the order of LPC cepstrum coefficients on linear prediction analysis is made lower than the order of analysis by LPC analysis.

BRIEF DESCRIPTION OF THE DRAWINGS

The object and features of the present invention will become more readily apparent from the following detailed description of the preferred embodiments taken in conjunction with the accompanying drawings in which:

FIGS. 3A and 3B are flowcharts showing the method for speech recognition according to a first embodiment of the present invention;

The same or corresponding elements and parts are designated at like reference numerals throughout the drawings.

DETAILED DESCRIPTION OF THE INVENTION

Figure 1:
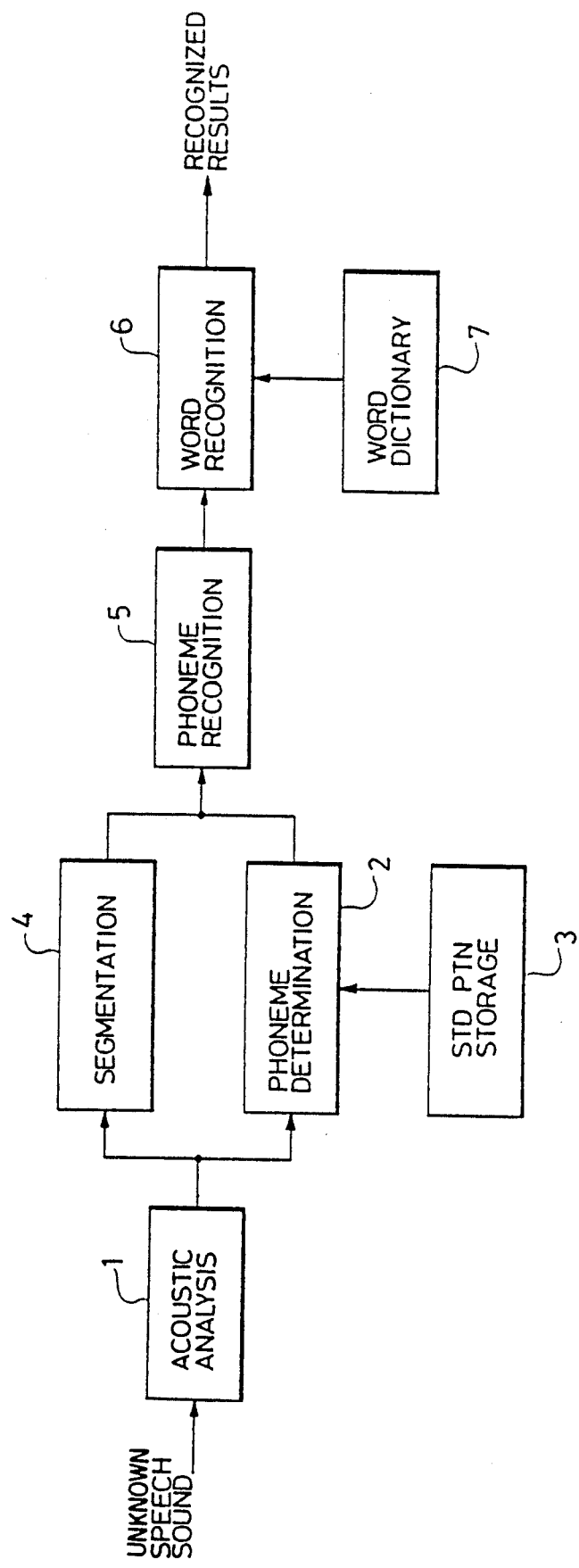
FIG. 1 is a fundamental block diagram of speech recognition apparatus used for speech recognition on the basis of phoneme recognition.

Referring to FIG. 1 of the drawings, a schematic block diagram of an embodiment of speech recognition apparatus used for carrying out the method for speech recognition according to the present invention is shown. In FIG. 1, the reference 1 is an acoustic analysis portion which analyzes speech sounds inputted via a microphone or the like with a corresponding analog signal being converted into a digital signal. In this acoustic analysis, linear prediction analysis is effected so as to obtain LPC cepstrum coefficients every frame periods of 10 milliseconds or so. Of course a set of band pass filters may be used instead. The reference 2 is a phoneme determining portion which determines a phoneme of each frame using the LPC cepstrum coefficients obtained in the acoustic analyzing portion 1. The reference 3 is a standard pattern storage in which standard patterns are stored. The standard patterns are produced for respective phonemes or groups of phonemes on the basis of characteristic parameters which are obtained using speech sounds from a number of speaking persons beforehand. The reference 4 is a segmentation portion which performs segmentation, i.e. detecting sound periods and determining a boundary between phonemes on the basis of analyzed output from the acoustic analysis portion. The reference 5 is a phoneme recognition portion which determines the sort of a phoneme for each phoneme period using the results from the segmentation portion 4 and the phoneme determining portion 2. As a result of the operation of the phoneme recognition portion 5, phoneme strings are completed. The reference 6 is a word recognition portion which compares the phoneme strings with a word dictionary 7 expressed by phoneme strings similarly, and outputs a word showing the highest similarity as the result of recognition.

The method for speech recognition according to the present invention utilizes the fact that there is a difference between vowels and semivowels or between different vowels in connection with the variation of the shape of the spectrum with respect to time. This will be described using an example of a recognition method for vowels and semivowels.

Figure 2A:
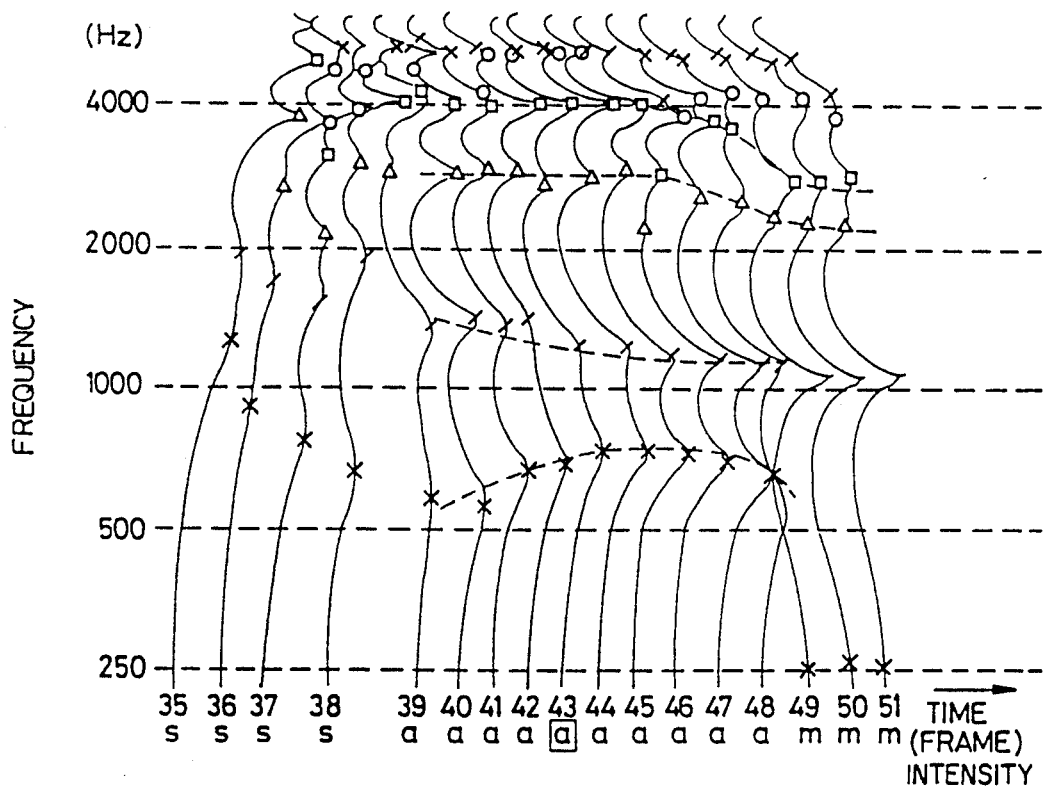
FIGS. 2A and 2B are charts showing examples of spectrum patterns useful for understanding the method according to the present invention.
Figure 2B:
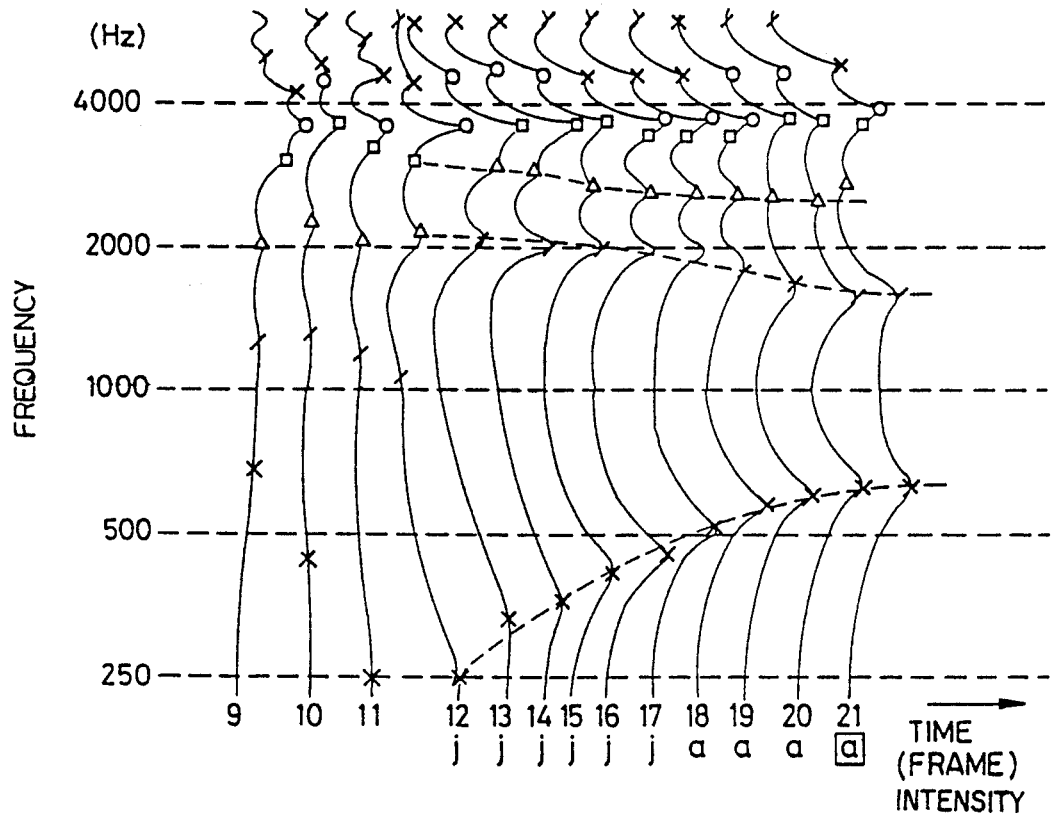

FIG. 2A shows a spectrum of a vowel /a/ obtained when OOSAMA is pronounced, and FIG. 2B shows a spectrum of a semivowel /ja/ obtained when YASUMONO is pronounced. In FIGS. 2A and 2B, the Y-distance indicates the frequency, while X-distance indicates time in terms of frames. Furthermore the X-distance also shows the intensity of spectrum. Righward movement of the spectrum indicates Formant, while the movement of Formant is illustrated by dotted lines.

Comparing FIGS. 2A and 2B, the difference between a vowel and a semivowel is that the movement of Formant from the beginning of a phoneme toward the center, which is indicated by a, of a vowel (i.e. /a/ in this case shown in FIG. 2A), is different from each other. Namely, in the case of /a/, the time length to the center of phoneme is 5 frames, whereas the time length in the case of /ja/ is 10 frames (only half of the time length of /ja/ is shown in FIG. 2B). Furthermore, the position of Formant is between 500 and 1000 Hz in the case of /a/, whereas Formant of /ja/ is broadly positioned throughout 250 to 1000 Hz. Such tendency is seen in the relationship between vowels. For instance, when comparing /a/ and /o/ with each other, the state of variation of spectrum at the time of approaching the center or departing from the center is different from another.

Paying attention to this phenomena, the present invention contemplates to distinguish phonemes such as /a/, /i/, /u/, /e/, /o/, /ja/, /ju/ and /jo/ with high accuracy compared to the conventional method of phoneme distinction effected in units of frames, with standard patterns of vowels and semivowels being formed of spectrum information of a plurality of frames.

In the case of applying a statistical distance to such a two-dimensional pattern, since the number of parameters tends to be large because of the long time of these phonemes, the amount of calculations becomes enormous although a method of matrix calculation, such as Bayes' discriminant is available. Therefore, statistical distance is used especially Mahalanobis' distance. While matrix calculation is also required for obtaining Mahalanobis' distance, since a covariance matrix can be made common when the variance among objective phonemes does not change drastically, it is possible to obtain Mahalanobis' distance with a small amount of first order calculations.

An embodiment of the present invention based on the above concept will be described with reference to FIGS. 3A and 3B. First, speech sound corresponding to a phoneme i from a number of speaking persons is inputted to produce standard patterns. Two-dimensional arrangement of LPC cepstrum coefficients formed of a plurality of spectrum information data of n frames is then obtained as spectrum information in a step 11 of a flowchart shown in FIG. 3A.

$$C_{ijk} = \begin{pmatrix} C_{i11}, C_{i12}, \ldots, C_{i1p} \\ C_{i21}, C_{i22}, \ldots, C_{i2p} \\ \cdot \\ \cdot \\ \cdot \\ C_{in1}, C_{in2}, \ldots, C_{inp} \end{pmatrix}$$

wherein p is the order of analysis.

The spectrum information is then converted into a one-dimentional arrangement $X_{ij}$ in a step 12.

$$X_{ij} = (C_{i11}, C_{i12}, \ldots, C_{i1p}, C_{i21}, \ldots, C_{i2p}, C_{ink}, \ldots, C_{inp})$$

Using, the above $X_{ij}$, a standard pattern of a phoneme i is resultant in a step 13, and a produced standard pattern is stored. The above steps 11 through 13 are repeatedly executed for all objective phonemes to obtain associated standard patterns which are to be stored in turn.

FIG. 3B shows a flowchart for recognizing input speech sounds. In a step 14, two-dimentional arrangement of LPC cepstrum coefficients are obtained where the order of analysis is p and the number of frames is n as follows:

$$C_{jk} = \begin{pmatrix} C_{11}, C_{12}, \ldots, C_{1p} \\ C_{21}, C_{22}, \ldots, C_{2p} \\ \cdot \\ \cdot \\ \cdot \\ C_{n1}, C_{n2}, \ldots, C_{np} \end{pmatrix}$$

This two-dimentional arrangement $C_{jk}$ is then converted into one-dimensional arrangement $X_j$ in a following step 15 as:

$$X_j = (C_{11}, C_{12}, \ldots, C_{1p}, C_{21}, \ldots, C_{2p}, C_{n1}, \ldots, C_{np})$$

Then it is determined whether learning is necessary or not in a step 16, and when it is determined that learning is necessary, a step 17 is executed to correct the standard patterns, which have been produced in the step 13 beforehand, using $X_j$. This step 17 of learning may be provided when necessary.

Using $X_j$ and the standard patterns, similarity on the basis of Mahalanobis' distance is obtained for respective phonemes in a step 18 to determine each phoneme thereby outputting recognized results.

Figure 4:
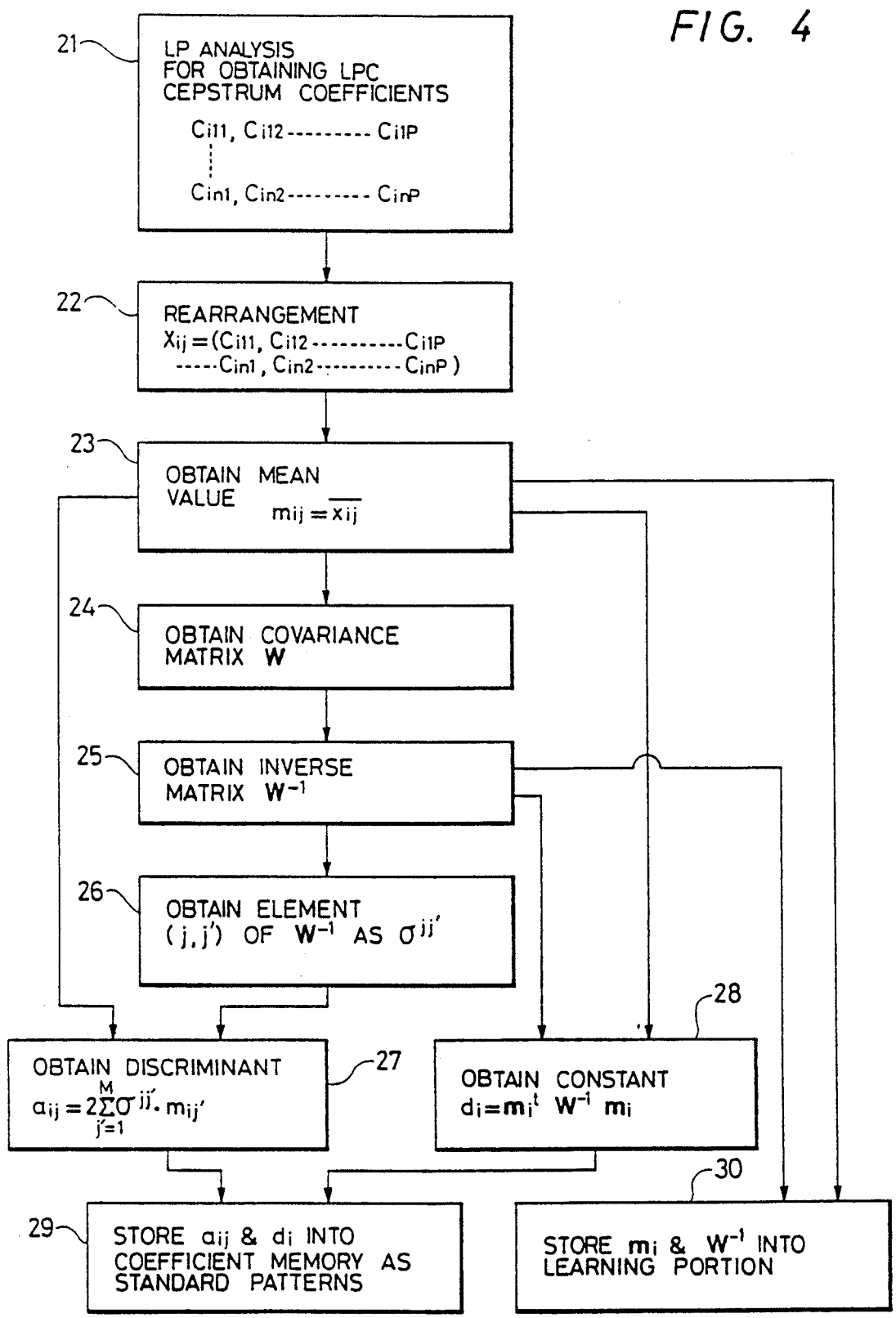
FIG. 4 is a flowchart showing the way of producing standard patterns according to the present invention.

FIG. 4 shows a process of producing standard patterns of vowels and semivowels according to the above-described concept in the case of involving learning as an example. Linear prediction analysis is effected in a step 21 in connection with an input sound corresponding to a phoneme i, and a two-dimentional pattern is formed by using those from $C_{ij1}$ to $C_{ijp}$ of n LPC cepstrum coefficients to be used as standard patterns, as a frequency axis. The reference i represents the type of phoneme, while the reference j indicates the order of frames. The reference p represents the order (degree) of analysis. Then parameters are rearranged in a step 22 to obtain:

$$X_{ij} = (C_{i11}, C_{i12}, \ldots, C_{i1p}, C_{i21}, \ldots, C_{i31}, \ldots, C_{inl}, C_{inp})$$

Furthermore, values of Xij obtained by a number of sounds are summed up in a step 23 to obtain a mean value $m_{ij}$ of $X_{ij}$ wherein j represents the order of parameters, and its maximum $M = n \times p$. A covariance matrix to be obtained in a step 24 is made common independent of the type of phonemes, and is expressed in terms of W. In a step 25, an inverse matrix $W^{-1}$ of W is obtained, and an element (j, j') thereof expressed by $\sigma^{jj'}$ is obtained in a step 26. Then a discriminant $a_{ij}$ for a $j^{th}$ parameter of the phoneme is obtained in a step 27 as:

$$a_{ij} = 2 \sum_{j'=1}^{M} \sigma^{jj'} m_{ij} \quad (1)$$

On the other hand, a constant $d_i$ determined by the phoneme is given in a step 28 as:

$$d_i = m_i^t W^{-1} m_i \quad (2)$$

wherein $m_i$ represents a vector of $m_{ij}$ and t represents transpose of a matrix.

These $a_{ij}$ and $d_i$ obtained in the above are stored in a coefficient memeory in a step 29 as phoneme standard patterns. In addition, the mean value $m_{ij}$ obtained in step 23 and the inverse matrix $W^{-1}$ obtained in the step 25 are stored in a learning portion in a step 30 to be used in learning operation.

The standard patterns obtained in this way are corrected by learning operation. After correction, phoneme determination is effected using similarity based on Mahalanobis' distance calculated from unkown input sounds and the corrected standard patterns.

Mahalanobis' distance $D_i^2$ with respect to the distribution of a phoneme i of an input parameter $X_j=(X_1, X_2, \ldots, X_n)$ is given by:

$$D_i^2 = X^t W^{-1} X - \sum_{j=1}^{K} a_{ij}X_j - m_i^t W^{-1} m_i \quad (3)$$

wherein t represents transpose of a matrix.

Since a first term of formula (3) does not depend on the sort of phonemes, similarity $L_i$ can be simply given by:

$$L_i = \sum_{j=1}^{M} a_{ij}X_j - m_i^t W^{-1} m_i \quad (4)$$

Since the second term of formula (4) is a constant determined by the type of phonemes, similarity $L_i$ is given as follows when using $d_i$ for the constant:

$$L_i = \sum_{j=1}^{M} a_{ij}X_j - d_i \quad (5)$$

In the relationship above, data of standard patterns are used for $a_{ij}$ and $d_i$.

Figure 5:
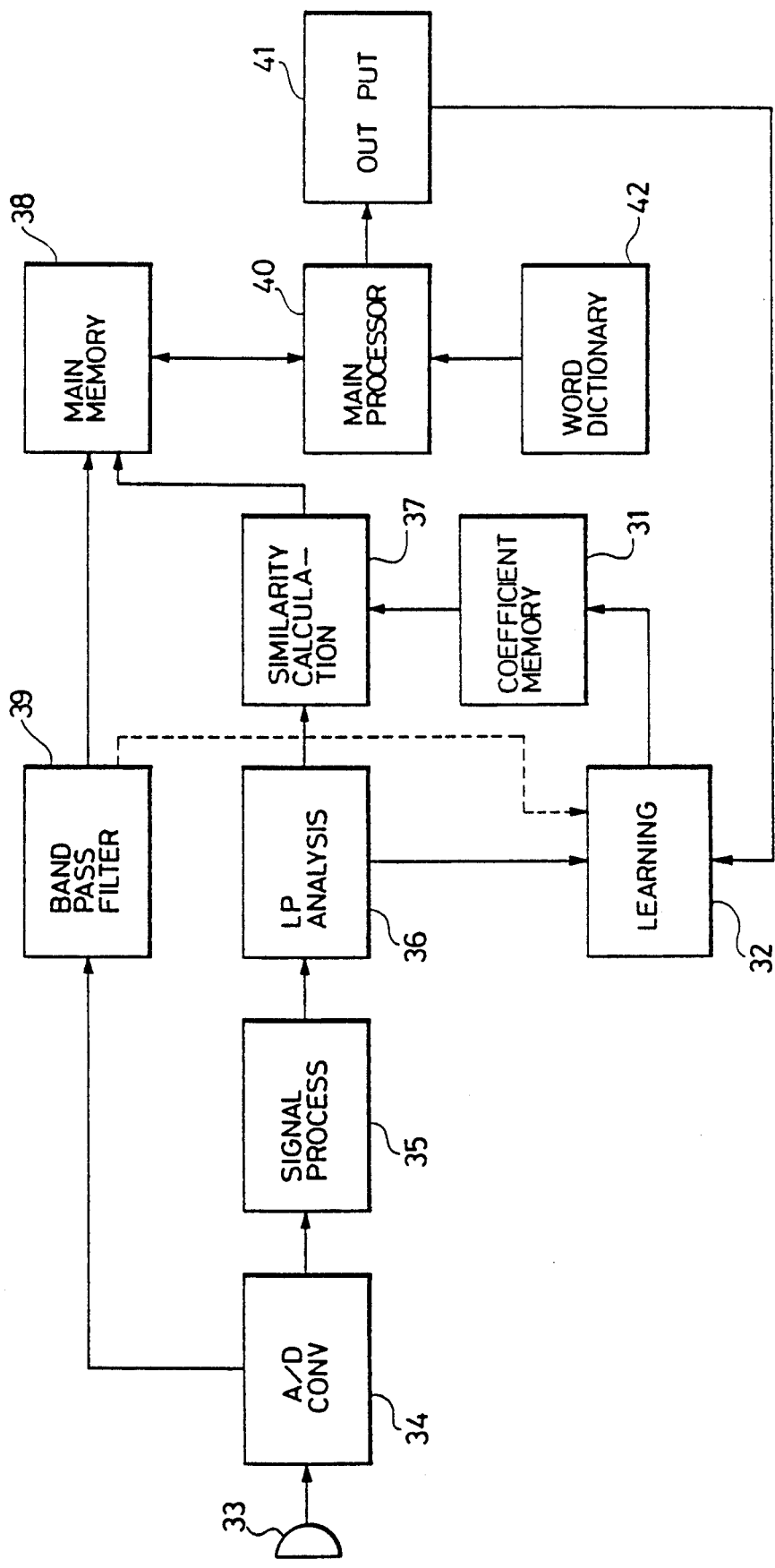
FIG. 5 is a block diagram showing an example of the structure of the speech recognition apparatus used for carrying out the method for speech recognition according to the present invention.

Now the recognition process in the case of involving learning will be described with reference to a block diagram of speech recognition apparatus of FIG. 5. First of all, the standard patterns $a_{ij}$ and $d_i$ obtained in the process of FIG. 4 are stored in advance in a coefficient memory 31. Also $m_i$ and $W^{-1}$ are stored in a learning portion 32 in advance.

The above-mentioned correction of the standard patterns through learning will be made as follows. Having a speaking person pronounce vowels and semivowels into microphone 33, inputted speech sounds are A/D converted by an A/D converter 34. Digital data obtained in this way is subjected to Humming window in a signal processing circuit 35 and to pre-emphasis. Then a linear prediction analysis processor 36 obtains LPC cepstrum coefficients, and rearranges the coefficients to obtain $X_i$ which is fed to a learning portion 32. In the above, the learning portion 32 may use parameter information from a band pass filter 39 responsive to digital data from the A/D converter 34 if necessary. Furthermore, $X_i$ is also fed to a similarity calculating portion 37. The similarity calculating portion 37 obtains similarity $L_i$ shown in formula (5) using the standard patterns stored in a coefficient memory 31. The similarity data is fed to a main memory 38. On the other hand, the band pass filter 39 obtains parameters, i.e. band power and full range power, for segmentation, which are fed to the main memory 38. A main processor 40 determines a position where learning should be made on a time scale using the results fed via the main memory 38 from the similarity calculating portion 37 and the band pass filter 39, and a determined position is instructed through an output portion 41 to the learning portion 32. The learning portion 32 effects adaptation of standard patterns to a present speaking person in the following process using stored mean value $m_i$ and covariance inverse matrix $W^{-1}$.

$$m'_i = (w \cdot X_t + m_i)/(w+1) \quad (6)$$

wherein w is a weighting coefficient.

$a'_{ij}$ to be adapted is derived from formula (1) using the above $m'_i$ as:

$$a'_{ij} = 2 \sum_{j=1}^{M} \sigma^{ij} m'_{ij} \quad (7)$$

Similarly, $d'_i$ to be adapted is given from formula (2) as:

$$d'_i = m'^t_i W^{-1} m'_i \quad (8)$$

The contents of the coefficient memory 31 are rewritten using the results obtained in the learning portion 32 such that the standard patterns $a'_{ij}$ and $d'_i$ are corrected to be adaptive to the present speaking person. With this process, learning is completed, and then actual recognition of speech sounds is performed in the following process.

Inputted speech sounds are A/D converted first by the A/D converter 34, and digital data fed through the signal processing circuit 35 to the linear prediction analysis processor 36 is used to obtain LPC cepstrum coefficients therein. The obtained LPC cepstrum coefficients are rearranged to obtain a series $X_j$. The similarity calculating portion 37 then calcultes similarity $L_i$ using $X_j$ and corrected standard patterns $a'_{ij}$ and $d'_i$ according to the following formula (9):

$$L_i = \sum_{j=1}^{M} a_{ij}X_j - m_i^t W^{-1} m_i \quad (9)$$

This $L_i$ and the results from the band pass filter 39 are fed to the main memory 38. The main processor 40 detects sound periods, and effects segmentation and phoneme recognition using these data so as to produce phoneme strings. The phoneme strings produced in this way are compared with the contents of the word dictionary 42 which are written in the form of phoneme strings in the same manner. Then a word showing the highest similarity is outputted as the result of recognition to be fed to the ouptut portion 41.

As described in the above, according to the present invention phoneme standard patterns are formed of spectrum information of a plurality of frames so as to sufficiently grasp the feature of each phoneme, and the phoneme standard patterns are automatically produced through learning so as to adapt to a present speaking person thereby providing high speech recognition ratio. Moreover, Mahalanobis' distance is used as a statistical distance measure while similarity calculation as well as calculations in learning is simplified, and therefore accurate speech recognition is attained without requiring a highly sophisticated computer having high operating accuracy.

Figure 6:
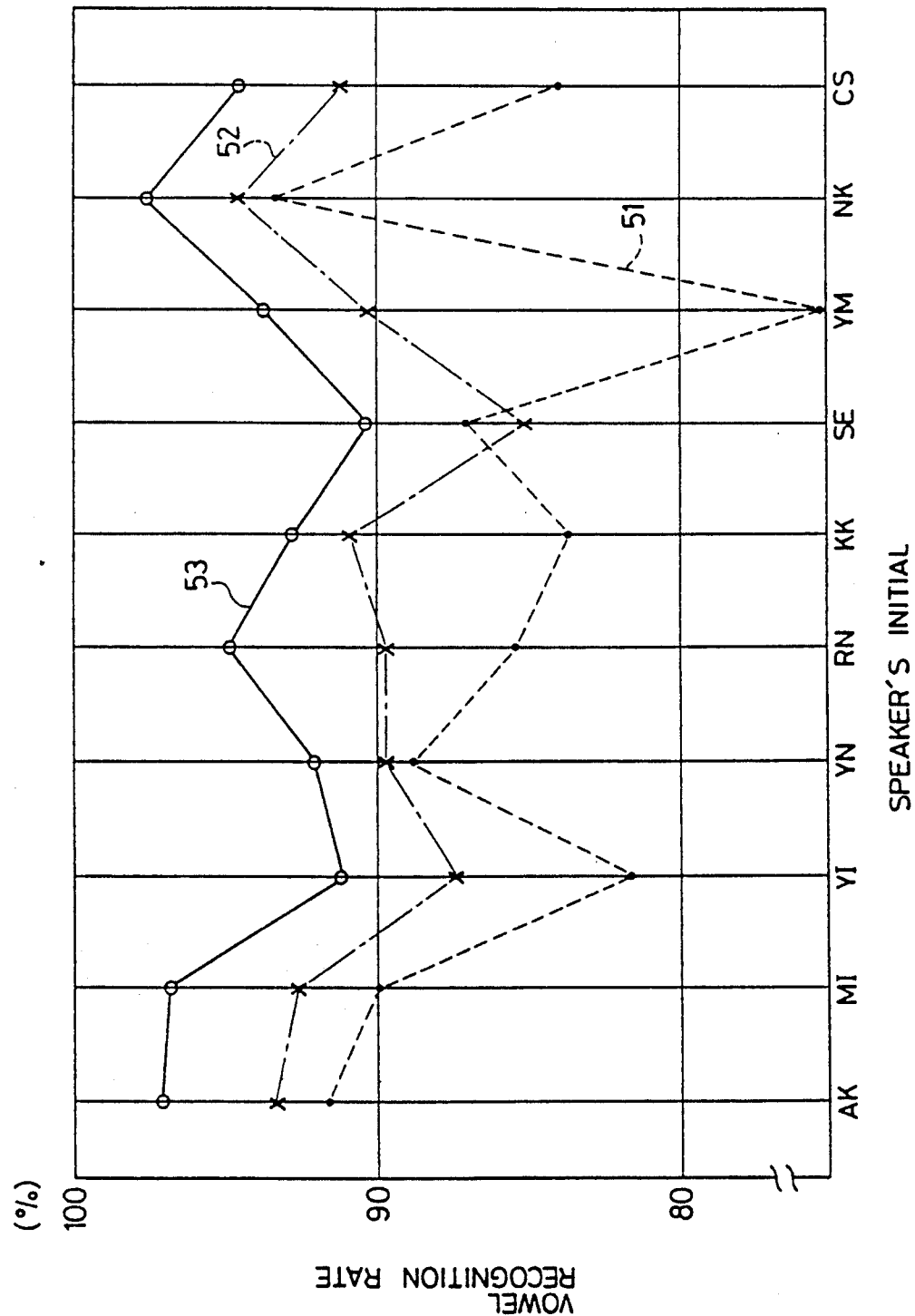
FIGS. 6 and 7 are characteristic diagrams showing the efficacy of the embodiment of FIG. 3 by way of sound recognition rate for respective speaking persons.

FIG. 6 shows a graph of recognition rates of vowels and nasal sounds obtained as the results of experiments using ten speakers including men and women. Curves 51 and 52 are resulted when phonemes are determined in units of frames according to a conventional method, and the curve 51 is obtained without learning while the curve 52 is obtained with learning. Another curve 53 is obtained according to the present invention. As will be understood from the comparison between these curves 51 to 53, although learning improves recognition to an extent even if determination is effected in units of frames as indicated by the curve 52, the degree of such improvement is still lower than the improvement obtained by the present invention. In FIG. 6, names of ten speaking persons are shown by their initials along X-distance.

In this way, when standard patterns are formed of spectrum information of a plurality of frames, recognition rate is remarkably bettered in connection with all the speaking persons such that an average error rate is only 6.7% which corresponds to 70% of the average error in the case of involving learning (curve 52).

Figure 7:
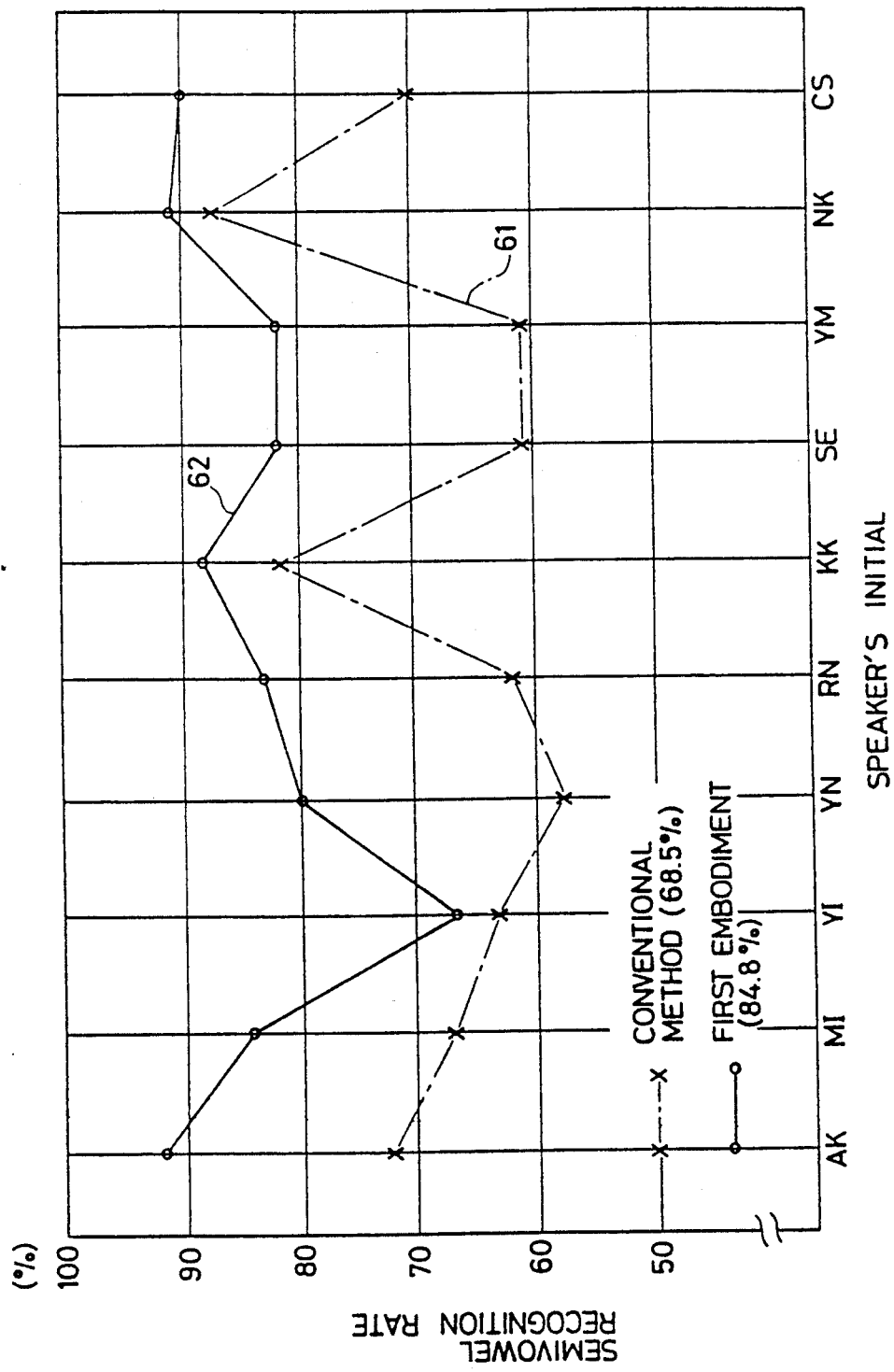

FIG. 7 shows a graph of recognition rates of semivowels obtained as the results of experiments using ten individual speakers including men and women. A curve 61 is resulted when phonemes are determined in units of frames with learning according to a conventional method, and another curve 62 is obtained according to the present invention. As will be understood from the comparison between these curves 61 and 62, while recognition rate by the conventional method is only 68.5%, the present invention method raises the recognition rate to 84.4%. In other words, recognition rate has been improved by 15.9% while error rate has been reduced by one half.

The efficacy of the above-described first embodiment may be summarized as follows:

(1) Since phoneme standard patterns are formed of spectrum information of a plurality of frames, high phoneme recognition rate is resulted.

(2) Phoneme standard patterns are automatically produced through learning so as to be adaptable to a present speaking person, high recognition rate can be obtained for individual speakers whose speech could not be recognized according to the conventional methods (see speaking persons YM and YI in FIG. 6).

(3) With the above features (1) and (2), speech recognition apparatus having an excellent performance can be formed, and a high word recognition rate is expected.

Although the recognition process described above includes phoneme learning, an important feature of the present embodiment resides in the fact that standard patterns are formed of spectrum information of a plurality frames and similarity is calculated on the basis of Mahalanobis' distance, a satisfactory phoneme recognition rate can be obtained without learning. Furthermore, the method according to the present invention reduces the amount of calculations in phoneme determination, while the method may be readily actualized by a speech recognition apparatus of a simple structure.

The spectrum information is not limited to the above-described LPC cepstrum coefficients, and therefore, other spectrum information obtained by a set of filters or PARCOR coefficients through LPC analysis may be used instead of LPC cepstrum coefficients.

A second embodiment of the present invention will be described with reference to a flowchart of FIG. 8 taking an example of the method of recognizing semivowels and contracted sounds.

This embodiment involves a method which is effective for phonemes whose spectrum variation with respect to time is relatively slow, such as not only semivowels and contracted sounds but also vowels, nasal sounds, fricative sounds.

While it will be described in connection with an example in which Mahalanobis' distance is used as a statistical distance measure, Bayes' discriminant may be used instead. In addition, the following second embodiment will be described in connection with an example in which LPC cepstrum coefficients are used as spectrum information. Prior to analyzing input unknown speech sounds, periods of five vowels, semivowels and contractive sounds are determined in advance using words spoken by a number of individual speakers. The process of producing standard patterns using such spoken words is as follows:

LPC cepstrum coefficients as high as $N^{th}$ order are obtained in connection with continuous n frames starting from a starting end of each phoneme, and those as high as $m^{th}$ order (N>m), i.e. $C_1=(C_1', C_2', \ldots, C_m')$, are extracted from entire coefficients. Then X frames are extracted (X<n) from the continuous n frames so as to include at least noncontinuous frames, for instance every other frames, and a vector $C=(C_1, C_2, \ldots, C_M)$ is produced using $C_1=(C_1', C_2', \ldots, C_m')$ wherein $M=X \times m$. Using the vector, C a mean value $m_i$ (i indicates a name of phoneme) and a covariance matrix W which is common to all the objective phonemes are obtained. Assuming an inverse matrix of W is expressed in terms of $W^{-1}$, and an element (j, j') thereof is represented by $\sigma^{jj'}$, then a weighting coefficient $a_{ij}$ for a phoneme i is given by:

$$a_{ij} = 2 \sum_{j=1}^{M} \sigma^{jj'} m_{ij} \qquad (10)$$

An average distance $d_i$ to a phoneme i is also obtained as:

$$d_i = m_i^t W^{-1} m_i \qquad (11)$$

These values $a_{ij}$ and $d_i$ are then stored in the standard pattern storage 3 as standard patterns.

Figure 8:
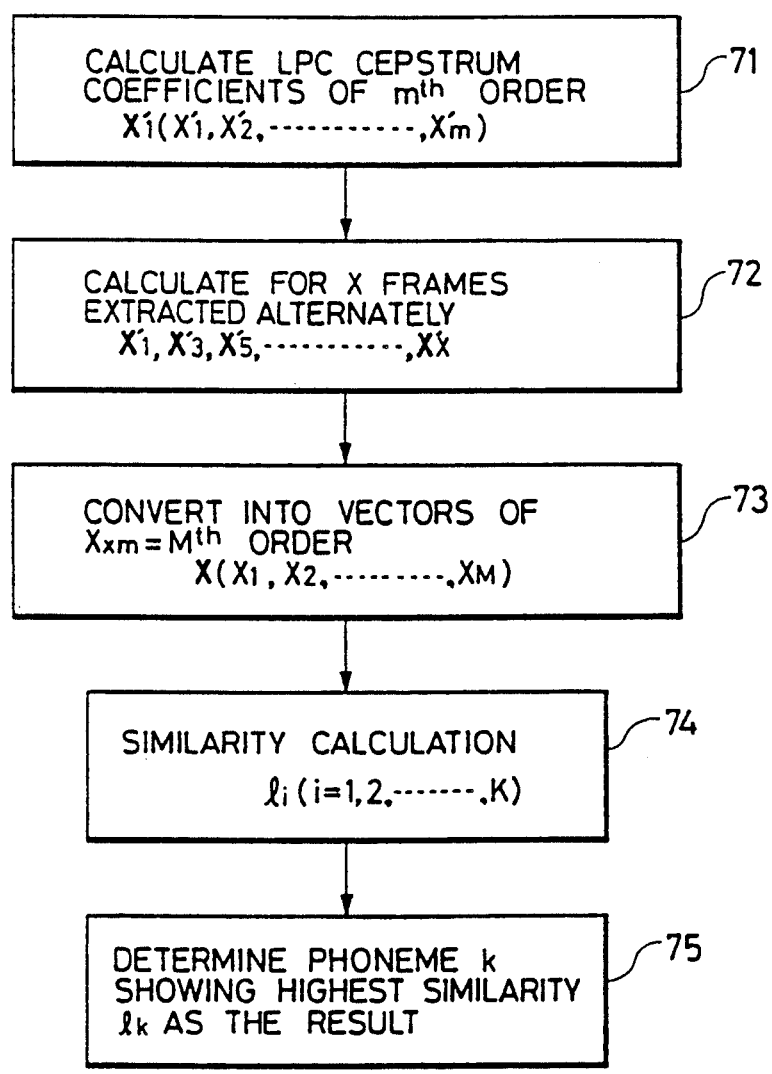
FIG. 8 is a flowchart showing the method for speech recognition according to a second embodiment of the present invention.

Nextly, unknown speech sounds inputted to the acoustic analyzing portion 1 are analyzed for linear prediction for each frame so as to obtain LPC cepstrum coefficients of $N^{th}$ order in connection with continuous n frames, and then LPC cepstrum coefficients $X_1(X_1', X_2', \ldots, X_m')$ as high as $m^{th}$ order (N>m) are extracted as shown in a step 71 of a flowchart of FIG. 8. Then X frames are extracted from the continuous n frames so as to include at least noncontinuous frames, for instance every other frame in step 72, and $X_1', X_3', \ldots, X_x'$ are calculated for X frames in step 72.

Then these vectors $X_1', X_3', \ldots, X_x'$ are converted into vectors $X=(X_1, X_2, \ldots, X_M)$ of $M^{th}$ order ($M=X \times m$) in a step 73 using the results of the steps 71 and 72.

Using X, similarity $l_i$ is obtained by the following formula using the standard patterns stored in the standard pattern storage 3:

$$l_i = \sum_{j=1}^{K} a_{ij} X_j - d_i \qquad (12)$$

The value of $l_i$ is obtained for respective frames of input speech sounds in a step 74, and a phoneme showing the highest similarity is fed to the phoneme recognition portion 5 as the result of determination in a step 75 which is performed in the phoneme determination portion 2. The phoneme recognition portion 5 produces a phoneme string by combining the results with the results from the segmentation portion 4, to send the same to a word recognition portion 6. The word recognition portion 6 searches a word dictionary 7 in which words are written in the form of time series of phonemes beforehand, so as to output a word showing the highest similarity as the result of recognition.

Figure 9A:
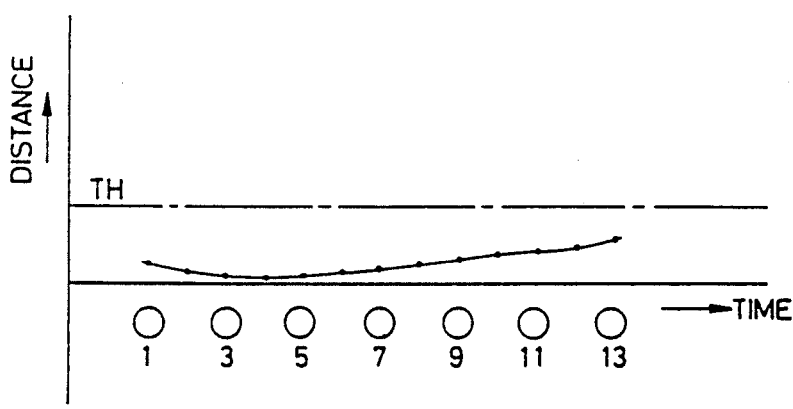
FIG. 9 A-C is an explanatory diagram for describing the way of frame extraction in the embodiment of FIG. 8.

FIG. 9A shows an example of a spectrum variation of semivowels and contracted sounds. X-distance of the graph of FIG. 9A indicates time in units of frames, while Y-distance indicates the distance between adjacent spectrums by way of euclidean distance of LPC cepstrum coefficients. The distance curve in FIG. 9A shows that the distance does not exceed a threshold TH throughout 13 frames, and that the variation of the spectrum with respect to time is slow. The threshold TH is set to a value so that a maximum value of recognition rate of objective phonemes, i.e. semivowels and contracted sounds in this example, is obtained. Therefore, there is no need to use all the frames for capturing variation in spectrum with respect to time. In this embodiment, frames are thinned to extract every other frames such that seven frames in total are used (see frames indicated at circles). In this case, the number of vectors of LPC cepstrum coefficients necessary for the determination of phonemes is $6 \times 7 = 42$. The following TABLE 1 is provided to compare the amount of calculations of multiplication and addition per one standard pattern. In TABLE 1, the amount of calculations are shown in connection with a case according to a conventional method of using all 13 frames and with a case according to the present embodiment in two parts, i.e. Bayes' discriminant and Mahalanobis' distance according to formula (12).

TABLE 1

| METHOD | SORT OF CALCULATION | DISTANCE MEASURE | |
|---|---|---|---|
| | | BAYES' DISCRIMINANT | MAHALANOBIS' DISTANCE |
| CONVENTIONAL METHOD | PRODUCT | 3236 | 78 |
| | SUM | 3238 | 79 |
| SECOND EMBODIMENT METHOD | PRODUCT | 986 | 42 |
| | SUM | 988 | 43 |

As will be understood from TABLE 1, the amount of calculations can be reduced by approximately 30% according to the present embodiment when comapred to the conventional method according to Bayes' discriminant, and also reduced to half according to Mahalanobis' distance.

The following TABLE 2 shows the results of comparison of accuracy in determination of semivowels contracted sounds between the conventional method of using all 13 frames and the present embodiment shown in FIG. 9A.

TABLE 2

| METHOD | ITEM | |
|---|---|---|
| | RECOGNITION RATE | STANDARD DEVIATION |
| CONVENTIONAL METHOD | 76.5% | 10.44% |
| SECOND EMBODIMENT METHOD | 78.1% | 10.02% |

As is apparent from TABLE 2, the recognition rate and standard deviation representing dispersion are both improved according to the present embodiment. The reason for such an improvment is considered that the feature of each phoneme can be effectively captured by thinning frames to be used so as to take a large view of slow spectrum variation with respect to time. Furthermore, it is considered that the improvement is resulted from the fact that it is possible to reduce dispersion due to causes of variation, such as the change in speaking persons and context, by removing superfluous spectrum information.

Figure 9B:
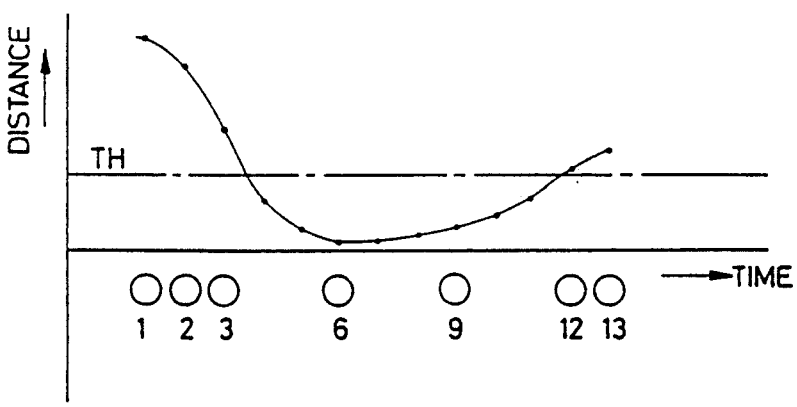
Figure 9C:
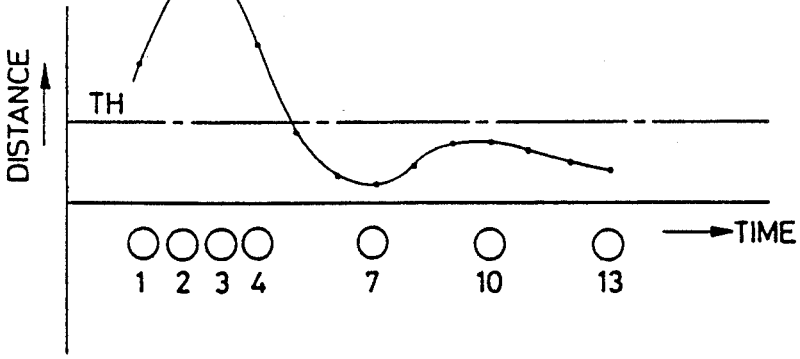

The present invention has a feature in that spectrum information of a plurality of frames is used for the determination of phonemes or syllables, and taking an example of a case where the number of frames is 13, methods illustrated in FIGS. 9B and 9C may also be used depending on the phonemes or syllables.

More specifically, a curve shown in FIG. 9B indicates distance between adjacent spectrums of a consonant /s/ by way of LPC cepstrum coefficients, and frames 1, 2, 3 where the distance exceeds the threshold TH are continuously used and periods where the distance does not exceed the threshold are used after being thinned out. This method is effective for phonemes and syllables having a difference in spectrum and the motion of boundaries as seen in the case of consonants /s/ and /h/. A curve shown in FIG. 9C indicates distance between adjacent spectrums of a consonant /z/ by way of LPC cepstrum coefficients, and frames 1, 2, 3, 4 where the distance exceeds the threshold TH are continuously used and periods where the distance does not exceed the threshold are used after being thinned out. This method is effective for phonemes and syllables having a difference in spectrum and the motion of boundaries as seen in the case of consonants /z/, /c/ and /h/.

In the above second embodiment, although it has been described that continuous frames are used for a region where the distance exceeds the threshold TH, these frames to be used are not necessarily required to be continuous.

Furthermore, the spectrum information used in the present embodiment may be obtained through either of linear prediction analysis, analysis by a set of band pass filters, or Fast Fourier Transform (FFT) analysis.

Moreover, similarity calculation is preferably effected using a statistical distance measure, such as a distance based on Bayes' discriminant, Mahalanobis' distance or linear discriminant function.

Considering the order (degree) of LPC cepstrum coefficients, when the order is high, an enormous amount of calculations is required for similarity calculation. According to a third embodiment of the present invention, therefore, it is arranged that the amount of calculations is reduced by setting the order of LPC cepstrum coefficients to be less than the order of LPC analysis, without decreasing the recognition rate.

Figure 10:
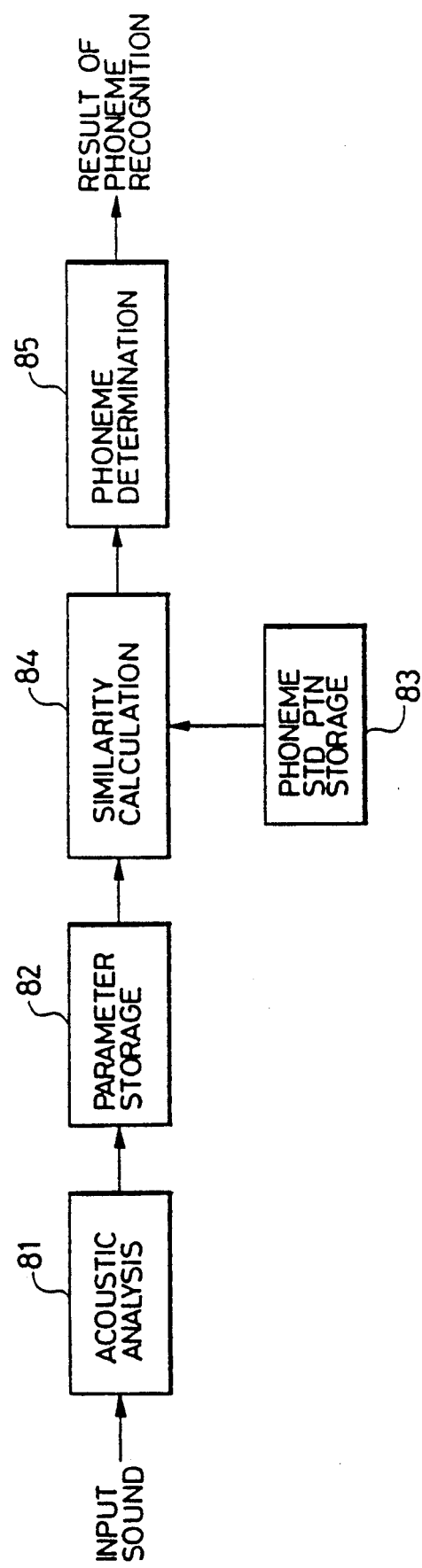
FIG. 10 is a block diagram showing speech recognition apparatus used for carrying out the method for speech recognition according to a third embodiment of the present invention.

The above-mentioned third embodiment will now be described with reference the drawings. FIG. 10 shows a block diagram of an apparatus using the phoneme recognition method according to the third embodiment. In FIG. 10, the reference 81 is an acoustic analyzing portion which converts an input speech signal into a digital signal so that LPC analysis is effected for each frame at $p^{th}$ order of analysis for obtaining LPC cepstrum coefficients of $n^{th}$ order ($p \geq n$) including $C_O$. The reference parameter storage which stores parameters (LPC cepstrum coefficients) of as much as m frames. The reference 83 is a standard pattern storage for storing standard patterns which are produced in advance for respective phonemes on the basis of feature parameters obtained using spoken sounds from a number of individual speakers. The reference 84 is a similarity calculating portion which calculates similarity between $m \times (n+1)$ unknown parameters outputted from the parameter storage 82 and the standard patterns of respective phonemes stored in the phoneme standard pattern storage 83. The reference 85 is a phoneme determining portion which outputs, as a result of recognition, a number of a phoneme showing the highest similarity.

A method of phoneme determination will be described taking an example of a case of unvoiced plosive sounds (/p/, /t/, /k/, and /c/). Input speech sounds are analyzed by the acoustic analyzing portion 81 every frame through linear prediction analysis (LPC analysis) to obtain LPC cepstrum coefficients. A window to be used in the analysis is a Humming window of 20 msec, while sampling frequency is 12 KHz and the order of analysis is $15^{th}$ (autocorrelation method).

LPC cepstrum coefficients obtained for respective frames are represented by $C = (C_O, C_1, \ldots, C_n)$ wherein $C_O$ is a power term ($O^{th}$ term) of the LPC cepstrum coefficients, $C_1$ l being a first order term and $C_n$ being an $n^{th}$ order term.

A time series vector of m frames is now expressed by $D = (C_{0,1}, C_{1,1}, C_{2,1} \ldots C_{n,1}, C_{0,2}, C_{1,2} \ldots C_{n,2}, C_{0,3}, C_{1,3} \ldots C_{n,3} C_{0,m}, C_{1,m}, \ldots C_{n,m})$. This D is a vector of $(N+1) \cdot m^{th}$ order, and is stored in the parameter storage 82. A similarity $P_j$ to a phoneme whose phoneme number is j within the time series vector D is given by the following formula:

$$P_j = \frac{1}{(2\pi)^{12} |\Sigma_j|} \exp\left( -\frac{1}{2} (D - \mu_j)^T \cdot \Sigma_j^{-1} (D - \mu_j) \right) \quad (13)$$

In the above, T represents transpose of a matrix, and $-1$ represents an inverse matrix.

Using $L_j$ for a doubled value of a logarithm of forumula (13), we obtain:

$$L_j = -(D = \mu_j)^T \cdot \Sigma_j^{-1}(D - \mu_j) + C_j \quad (14)$$

wherein $C_j = -2\log\{(2\pi)^{12} \cdot |\Sigma_j|\}$.

Therefore, when $\mu_j$ and $\Sigma_j$ are produced using LPC cepstrum coefficients to be a standard pattern of a phoneme number j stored in the phoneme standard pattern storage 83, the determination of phonemes can be made by the phoneme determining portion 85 by obtaining a maximum value of $L_j$ of formula (14).

The feature of the present embodiment is that the number of order of the time series vector D can be compressed by simply cutting off the order of LPC cepstrum coefficients without using the principal component analysis or the like. Now it will be described about a constant defining the order of D, i.e. the number m of frames and cut off order n. The following TABLE 3 shows the relationship between the number m of frames and phoneme recognition rate. In this example, a cut off order n is set to 4.

TABLE 3

| PHONEME | NUMBER OF FRAMES (m) | | | | |
|---|---|---|---|---|---|
| | 1 | 2 | 3 | 5 | 6 |
| /p/ | 75.3 | 85.8 | 84.0 | 79.3 | 76.5 |
| /t/ | 57.8 | 71.3 | 78.6 | 81.3 | 81.9 |
| /k/ | 83.9 | 90.1 | 90.8 | 90.4 | 90.1 |
| /c/ | 64.9 | 84.6 | 92.9 | 96.4 | 97.5 |
| AVERAGE | 71.0 | 83.0 | 86.6 | 86.8 | 86.5 |

As will be understood from TABLE 3, the recognition rates of respective phonemes are saturated at a stage of three frames or so, while the average recognition rate is also saturated at a stage of three frames. Although the recognition rate can be further improved by 0.2% with four frames, such a difference can be ignored in view of the compression of the number of order. Accordingly, it is desirable that the number of frames is determined as $m = 3$.

Figure 11:
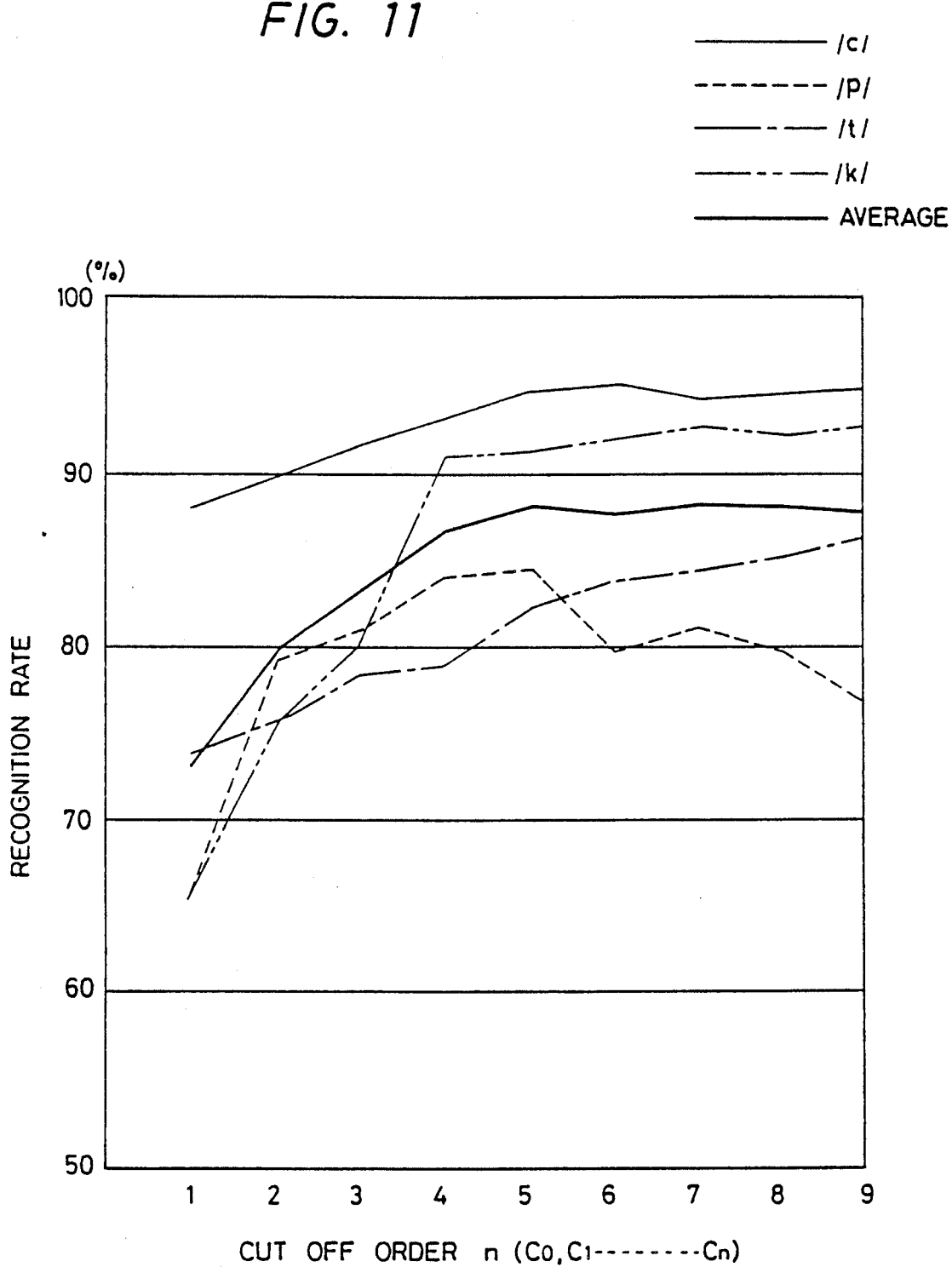
FIG. 11 is a diagram showing the relationship between recognition rate of plosive sounds and neglecting order of LPC cepstrum coefficients in the third embodiment of the present invention.

Nextly, fixing the number of frames as $m = 3$, it will be described about the cut off order n of LPC cepstrum coefficients. FIG. 11 shows the relationship between the cut off order of LPC cepstrum coefficients and phoneme recognition rate such that X-distance indicates the cut off order n and Y-distance indicates recognition rate in percent. A thin solid curve is for /c/, a dotted curve being for /p/, a dot-dash curve being for /t/, two-dot-dash curve being for /k/, and a thick solid curve indicating an average recognition rate of all the phonemes. As is apparent from FIG. 11, the average recognition rate is substantially saturated at $n = 4$, assuming a maximum value of 88.1% at $n = 5$, and the average recognition rate gradually lowers due to the lowering of the curve for /p/ after $n = 6$. From the above it will be understood that the order of LPC cepstrum coefficients is only requied to be $5^{th}$ or so, and higher order coefficents are unnecessary. The reason for this resides in the characteristics of LPC cepstrum coefficients. Since LPC cepstrum coefficients are inverse Fourier coefficents of logarithm of a spectrum, lower order coefficients exhibit large-view features of the spectrum, while higher order coefficients exhibit detailed features of the same. Such detailed features of a spectrum are apt to be influenced by causes of variation, such as individuality, context or the like, and does not greatly contribute to the determination of phonemes when viewed statistically. Accordingly, those which are useful for phoneme determination are large-view features of a spectrum, and therefore, LPC cepstrum coefficients can be cut off at an order which is necessary and sufficient for expressing the large-view features. In the case of unvoiced plosive sounds, the cut off order is set to $4^{th}$ to $5^{th}$, and this is substantially the same for voiced plosive sounds and nasal sounds. On the other hand, the cut off order is $7^{th}$ to $8^{th}$ in the case of semivowels. Generally, it is sufficient to set the cut off order of LPC cepstrum coefficients to a value lower than the order of analysis in LPC analysis, and the same may be less than 2/3 of the order of analysis in most cases.

In this way, the compression of parameters according to the present embodiment can be achieved by only cutting off the order of LPC cepstrum coefficients without requiring any calculations.

Now the amount of calculations according to the third embodiment will be compared with that according to a conventional method taking an example of unvoiced plosive sounds (/p/, /t/, /k/, /c/). It is assumed that the cut off order of LPC cepstrum coefficients is $5^{th}$ order, namely ($C_0, C_1 \ldots C_5$), and the number of frames is 3. Accordingly, the number of parameters is $6 \times 3 = 18$.

The following TABLE 4 shows the amount of calculations in comparison with a conventional example, using formula (14) for similarity calculation and treating $C_j$ as a constant.

TABLE 4

| | CONTENTS OF CALCULATION | | | | | |
|---|---|---|---|---|---|---|
| | PARAMETER COMPRESSION | | SIMILARITY CALCULATION (PER 1 PHONEME) | | TOTAL AMOUNT OF CALCULATION (4 PHONEMES) | |
| SORT OF CALCULATION | + & − | · | + & − | × | + & − | · |
| THIRD EMBODIMENT METHOD | 0 | 0 | 361 | 342 | 1444 | 1368 |
| CONVENTIONAL METHOD | 1375 | 1375 | 625 | 600 | 3875 | 3775 |

− & − addition and subtraction;
· multiplication

As is apparent from TABLE 4, the third embodiment does not require calculations for the compression of parameters, and since the number of parameters is smaller than that in a conventional example, the amount of similarity calcultion is also smaller than that according to the conventional method. A total amount of calculations for recognizing an unvoiced plosive sound can be reduced such that the amount of additions and subtractions is only 1/2.7 of that according to the conventional method and the amount of multiplications is only 1/2.8 of the same. In this way, the amount of calculations can be considerably reduced, while phoneme recognition rate does not substantially change. Comparing with an average phoneme recognition rate, although the conventional example shows a higher rate (90%) than a recognition rate (88.1%) according to the third embodiment in the case of unvoiced plosive sounds, the third embodiment provides a higher recognition rate (86.4%) than that (85%) according to the conventional example in the case of voiced plosive sounds Therefore, it can be said that the difference in recognition rate hardly exists when putting these rates together. The feature of a small amount of calculations attained without suffering from decrease in phoneme recognition rate is extremely advantageous because it makes it possible to miniaturize the apparatus and minimize the cost of the same.

Although distance based on Bayes' discriminant of formula (14) has been used for the similarity calculation performed by the similarity calculation portion 4 in the above description, other statistical distance measure may be used in place of Bayes' discriminant. For instance, Mahalanobis' distance $M_j$ is given by:

$$M_j = (D - \mu_j)^T \cdot \Sigma^{-1} \cdot (D - \mu_j) = D^T \cdot \Sigma^{-1} \cdot D - 2\mu_j^T \cdot \Sigma^{-1} \cdot D + \mu_j^T \cdot \Sigma^{-1} \cdot \mu_j \quad (15)$$

In the above formula (15), since the first term is unrelated to j, this is unnecessary when comparing only the magnitude. Furthermore, the third term is a constant which has no relation with unknown input, and this is expressed in terms of $F_j$. As a result, formula (15) can be simplified as follows:

$$M_j 32 F_j - a_j \cdot y \quad (16)$$

wherein $a_j = 2 \cdot \mu_j^T \cdot \Sigma^{-1}$

Formula (16) has a feature that the amount of calculations is further reduced when compared to formula (14).

Therefore, the present invention is more advantageous than the conventional example also in the case of using forumula (16).

Furthermore, it is a matter of course that other statistical distance measures, such as a linear discriminant coefficient, may also be used in place of the above-mentioned distance measures.

Figure 12:
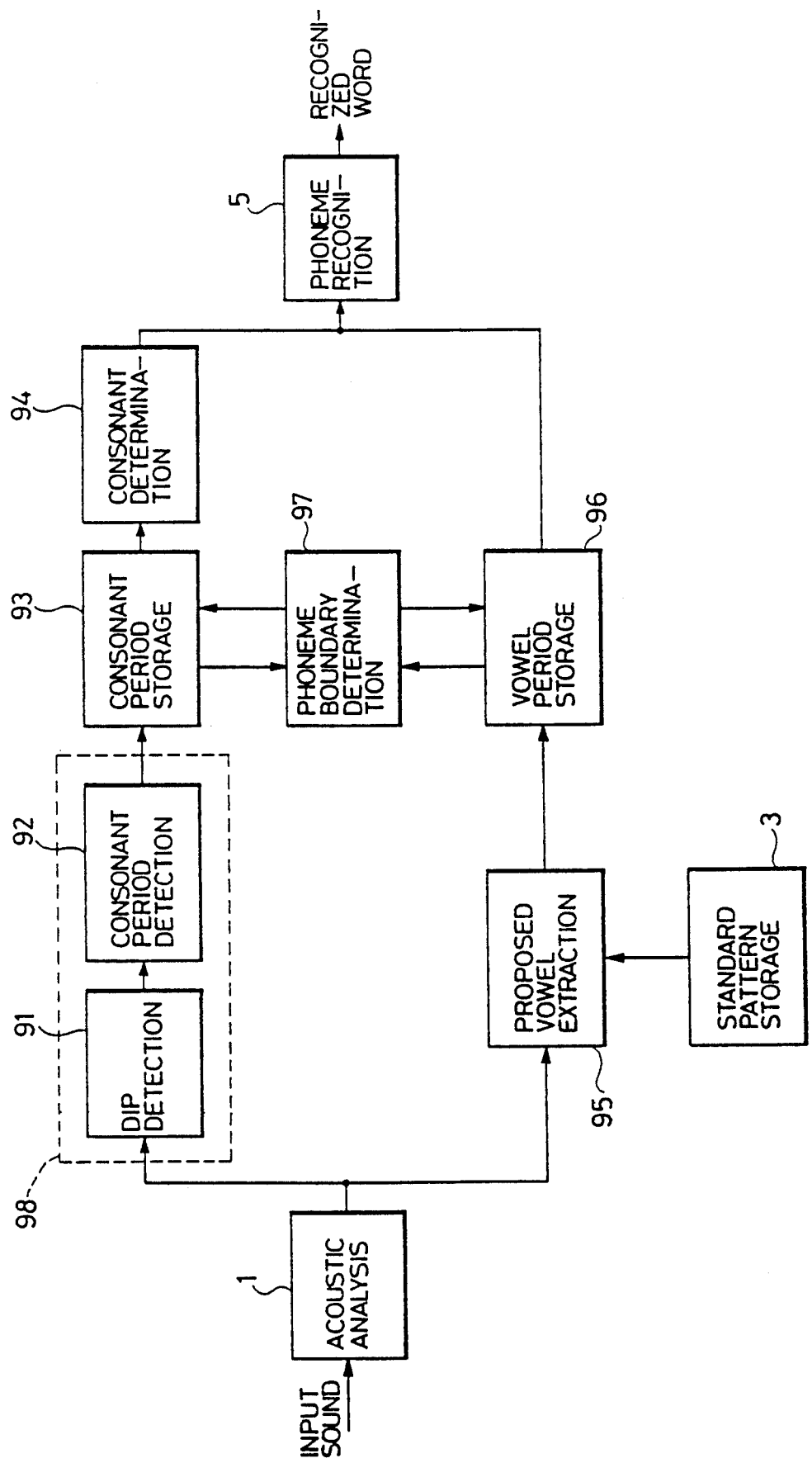
FIG. 12 is a block diagram showing a concrete example of a segmentation portion and phoneme determination portion used in the present invention.

FIG. 12 shows an example of the structure of speech recognition apparatus which is arranged to further improve the phoneme segmentation and phoneme recognition rate respectively executed by the phoneme recognition portion 2 and the segmentation portion 4 of the block diagram shown in FIG. 1. Standard patterns to be stored in the standard pattern storage 3 are prepared beforehand using $p^{th}$ order LPC cepstrum coefficients of n frames located around the center of a phoneme using vowels and nasal sounds. More specifically, each standard pattern is formed of a two-dimentional pattern having time axis and frequency axis. Using $C_{inp}$ for $p^{th}$ order LPC cepstrum coefficients of an $n^{th}$ frame of a phoneme i, a vector $y_i$ is produced as:

$$y_i = (C_{i11}, C_{i12}, \ldots, C_{i1p}, C_{i21}, \ldots, C_{i31}, \ldots, C_{inl}, \ldots, C_{inp})$$

Summing up values of $y_i$ resulted from a number of speech sounds, a mean value $m_{ij}$ thereof is obtained wherein j shows the order of parameters and its maximum is $k = n \times p$. Covariance matrix is made common to all the phonemes, and is expressed by W. Using $W^{-1}$ for an inverse matrix of W, and using $\sigma^{jj'}$ for an element (j, j'), a weighting coefficient $a_{ij}$ for a $j^{th}$ parameter of a phoneme i is given by:

$$a_{ij} = 2 \sum_{j=1}^{k} \sigma^{jj'} m_{ij} \quad (17)$$

Mahalanobis' distance $D_i^2$ with respect to the distribution of a phoneme i of parameter $X = (X_i, X_2, \ldots, X2, \ldots, X_j, \ldots, X_k)$ obtained from speech sounds of a number of speaking persons, is given by:

$$D_i^2 = X^t W^{-1} X - \sum_{j=1}^{k} a_{ij} X_j + m_i^t W^{-1} m_i \quad (18)$$

wherein t represents transpose of a matrix.

Since a first term of formula (18) does not depend on the sort of phonemes, it is omitted to simplify similarity $L_i$ as:

$$L_i = \sum_{j=1}^{k} a_{ij} X_j - m_i^t W^{-1} m_i \quad (19)$$

Therefore, all required to be stored in the standard pattern storage 3 are $a_{ij}$ and the constant $m_i{}^t w^{-1} m_i$ of formula (19).

Then similarity $L_i$ to the parameter $X=(X_1, X_2, \ldots, X_j, \ldots, X_k)$ is calculated using formula (19) by a proposed vowel period extracting portion 95, and proposed vowel periods are extracted on the basis of the stability of spectrum defined by the continuity and degree of the similarity to vowels, and the results thereof are fed to a vowel period storage 96.

On the other hand, after acoustic analysis a dip detecting portion 91 detects power dips of a band pass filter. A consonant period determining portion 92 determines a period where power difference across a frame at which power becomes maximum, assumes minimal or maximal value as a provisional consonant period, and sends the result to a consonant period storage 93. The dip detecting portion 91 and the consonant period determining portion 92 form the proposed consonant period extracting portion 98. The contents of the consonant period storage 93 and the contents of the vowel period storage 96 are compared with each other by a phoneme-boundary determining portion 97 so as to determine a boundary between phonemes. In this case, since the standard patterns stored in the standard pattern storage 3 are statistically formed of a plurality of frames around a center of a phoneme, it is possible to absorb a small variation in spectrum within a vowel by regarding the same as a simple disturbance of a spectrum within a vowel. At a vague region around a boundary between a vowel and a consonant, since spectrum is unstable with respect to time, a high similarity does not appear. Using this characteristic it is possible to accurately extract a vowel period.

Accordingly, proposed consonant periods, where there is no possibility of the existence of phoneme boundaries, are removed, and those whose consonant periods have been mistaken greatly are corrected so that results thereof are fed to the consonant period storage 93 in connection with cosonants and to the vowel period storage 96 in connection with vowels.

Subsequently, a consonant determining portion 94 determines a consonant by effecting calculation of similarity to the standard patterns at a new period using the results determined by the phoneme determining portion 97 and fed through the consonant period storage 93. This result is combined with the result from the vowel period storage 96 so as to effect phoneme recognition by the phoneme recognition portion 5, and the result of recognition is fed to a word recognition portion.

The above-described embodiments are just examples of the present invention, and therefore, it will be apparent for those skilled in the art that many modifications and variations may be made without departing from the scope of the present invention.

What is claimed is:

1. A method recognizing speech comprising the steps of:
   (a) dividing speech sounds into continuous N frames each having a predetermined time period;
   (b) analyzing speech sounds for each of said N frames so as to obtain spectrum information;
   (c) extracting n frames from said N frames such that said n frames include frames noncontinuous in said continuous N frames wherein $n<N$, said noncontinuous n frames being extracted from a region where variation rate of distance determined by said spectrum information and a standard pattern is below a predetermined value; and
   (d) recognizing phonemes or syllables of said speech sounds by calculating similarity between said spectrum information of said n frames and said standard patterns, which are produced using speech sounds from a number of speaking persons in advance.

2. A method as claimed in claim 1, wherein said spectrum information is obtained through one of linear prediction analysis, a set of band pass filters, or Fast Fourier Transform analysis.

3. A method as claimed in claim 1, wherein the similarity calculation is effected using a statistical distance measure.

4. A method as claimed in claim 3, wherein said statistical distance measure is one of a distance based on Bayes' discriminant, Mahalanobis' distance, and linear discriminant function.

5. A method of recognizing speech, comprising the steps of:
   (a) receiving known speech sounds including given phonemes from a number of unspecified speaking persons;
   (b) dividing said known speech sounds into a plurality of frames each having a predetermined time period;
   (c) obtaining LPC cepstrum coefficients, for each of said frames, from said known input speech sounds through linear prediction analysis for each of said given phonemes;
   (d) obtaining a mean value from said LPC cepstrum coefficients for each of said phonemes;
   (e) producing a first standard pattern formed of spectrum information of a plurality of said frames using said mean value for each of said phonemes or for each of said phonemes belonging to each group determined by characteristics of said known speech sounds;
   (f) receiving known speech sounds including vowels of said phonemes from a speaking person;
   (g) dividing said known speech sounds from said speaking person into a plurality of frames each having a predetermined time period;
   (h) obtaining second LPC cepstrum coefficients, for each of said frames, from said known input speech sounds of said speaking person through linear prediction analysis;
   (i) obtaining a new mean value from said second LPC cepstrum coefficients for each of said phonemes;
   (j) producing a new standard pattern by combining said new mean value with said mean value used for producing said first standard pattern thereby correcting said first standard pattern;
   (k) subsequent to step (j), receiving unknown speech sounds from said speaking person;
   (l) dividing said unknown speech sounds from said speaking person into a plurality of frames;
   (m) obtaining third LPC cepstrum coefficients, for each of said frames, from said unknown input speech sounds of said specified speaking person through linear prediction analysis;
   (n) obtaining similarity or phoneme strings on the basis of Mahalanobis' distance using said second and third LPC cepstrum coefficients;
   (o) effecting segmentation of phonemes using said similarity or phoneme strings, thereby producing phoneme strings with determination being made for each period obtained by said segmentation; and (p) recognizing a word by comparing said phoneme string with words in a word dictionary expressed in terms of phoneme strings.

6. A method as claimed in claim 5, wherein said step of obtaining similarity of phoneme strings comprises the steps of:

(a) dividing said unknown speech sounds into a plurality of continuous frames and obtaining spectrum information for each frame; and (b) extracting a plurality of frames from said continuous frames such that frames noncontinuous in said continuous frames are included, and obtaining spectrum information therefor as said spectrum information of said unknown speech sounds, said noncontinuous frames being extracted from a region where variation rate of distance determined by said spectrum information and said standard pattern is below a predetermined value.

7. A method as claimed in claim 5, wherein said spectrum information is obtained through linear prediction analysis, the order of said LPC cepstrum coefficients being set to a value lower than the order of said linear prediction analysis.

8. A method as claimed in claim 5, wherein each of said steps of producing said first standard pattern and producing said new standard pattern comprises a step of obtaining a covariance matrix using said mean value, and a step of obtaining an inverse matrix using said covariance matrix.

* * * * *